(12) United States Patent
Coley

(10) Patent No.: US 12,156,511 B1
(45) Date of Patent: Dec. 3, 2024

(54) CANINE FLOTATION DEVICE

(71) Applicant: Likell Coley, Palm Beach Gardens, FL (US)

(72) Inventor: Likell Coley, Palm Beach Gardens, FL (US)

( * ) Notice: Subject to any disclaimer, the term of this patent is extended or adjusted under 35 U.S.C. 154(b) by 0 days.

(21) Appl. No.: 17/726,962

(22) Filed: Apr. 22, 2022

(51) Int. Cl.
*A01K 29/00* (2006.01)
*B63C 9/08* (2006.01)

(52) U.S. Cl.
CPC ........ *A01K 29/00* (2013.01); *B63C 2009/084* (2013.01)

(58) Field of Classification Search
CPC ........ A01K 29/00; A01K 13/006; B63C 9/08; B63C 2009/084; B63C 9/04; B63C 9/155; A63B 35/00; A63B 31/00; A63B 31/08; A63B 69/14; B63B 35/58; B63B 34/52
See application file for complete search history.

(56) References Cited

U.S. PATENT DOCUMENTS

| | | | | |
|---|---|---|---|---|
| 1,265,580 A | * | 5/1918 | Zofchak | B63C 9/08 441/88 |
| 1,562,276 A | * | 11/1925 | Assenzio | A47C 15/006 441/132 |
| 2,800,666 A | * | 7/1957 | Allenbach | B63C 9/08 441/113 |
| 4,489,677 A | * | 12/1984 | Handley | A61D 3/00 119/725 |
| 4,619,620 A | * | 10/1986 | Felter | B63B 34/54 441/131 |
| 5,632,235 A | * | 5/1997 | Larsen | A01K 27/006 119/858 |
| 6,273,774 B1 | | 8/2001 | Warzecha | |
| 6,443,101 B1 | * | 9/2002 | Fazio | A01K 27/003 119/792 |
| 6,659,824 B1 | * | 12/2003 | McCormick | B63C 9/125 441/106 |
| 6,722,307 B1 | | 4/2004 | Rogers | |
| 6,851,394 B1 | | 2/2005 | Young | |
| 7,052,345 B1 | * | 5/2006 | Rowan | B63C 9/1255 441/80 |
| 7,357,688 B2 | | 4/2008 | Ferrara | |
| 8,182,300 B2 | | 5/2012 | Cosson | |

(Continued)

FOREIGN PATENT DOCUMENTS

| | | | |
|---|---|---|---|
| GB | 190911122 A | * | 5/1909 |
| KR | 20180002811 U | * | 3/2017 |

*Primary Examiner* — Magdalena Topolski
*Assistant Examiner* — Alanna K Peterson
(74) *Attorney, Agent, or Firm* — Cramer Patent & Design PLLC; Aaron R. Cramer

(57) ABSTRACT

A Canine Flotation Device is a flotation aid for dogs undergoing water-based physical therapy rehabilitation. The device has of a section of hard foam, such as Styrofoam® which floats upon the surface of the water and borders the entire dog. The center of the foam board is cut out to accommodate the dog while the dog is in a "dog paddle" position. The dog is held in place by a textile harness which holds the chest, belly, and hind quarters of the dog. The harness is then attached to the foam board by six (6) nylon straps of which two (2) each are on the front, side, and rear of the foam. Each strap is adjustable to securely fit the dog and allow for proper floatation. It is envisioned that the device would be made available in a plurality of sizes.

1 Claim, 5 Drawing Sheets

(56) References Cited

U.S. PATENT DOCUMENTS

| | | |
|---|---|---|
| 8,662,020 B1 | 3/2014 | Tecco |
| 9,370,166 B1 * | 6/2016 | Ford .................... A01K 27/002 |
| 9,700,020 B2 | 7/2017 | Ackerman et al. |
| D881,487 S | 4/2020 | Davis |
| 10,611,444 B1 * | 4/2020 | Orsini ................... B63C 9/1255 |
| 2007/0141925 A1 * | 6/2007 | Turner ................. A47C 15/006 |
| | | 114/345 |
| 2008/0227346 A1 * | 9/2008 | Von Zell ............. A01K 13/006 |
| | | 441/129 |
| 2010/0240272 A1 * | 9/2010 | Cosson .................. B63C 9/115 |
| | | 441/106 |
| 2014/0041599 A1 * | 2/2014 | Sebo .................... A01K 13/006 |
| | | 119/850 |
| 2021/0137783 A1 * | 5/2021 | Breighner .............. A61H 37/00 |
| 2022/0111942 A1 * | 4/2022 | Zhou .................... B63B 34/565 |

* cited by examiner

CANINE FLOTATION DEVICE

RELATED APPLICATIONS

None.

FIELD OF THE INVENTION

The presently disclosed subject matter is directed to a flotation device and more specifically to a flotation device for canines.

BACKGROUND OF THE INVENTION

One type of physical therapy commonly used is that of water-based or aqua-therapy. The water helps to support the patient and allows muscles to be used without having to bear the entire weight of the body. Such therapy is not only used on humans, but animals as well, such as horses and dogs. However, many dogs are afraid of the water and the action of placing them in the water will do more harm than good. Older dogs may quickly become stressed, whereupon their heart can become negatively impacted.

Any attempt to support the dog will end up causing the assistant to become wet, scratched or otherwise harmed to the point that the therapy is given up on entirely to the detriment of the dog's overall health. Accordingly, there exists a need for a means by which a dog can be easily supported while taking part in water-based physical therapy in a manner which addresses the above concerns. The development of the canine flotation device fulfills this need.

SUMMARY OF THE INVENTION

The principles of the present invention provide for a canine flotation device that has an outer frame having 6 straps, a harness having a plurality of stitching securing an end of each of the straps to the harness, and 2 hemispherical openings are positioned to support a body of the dog without impacting movement of the dog. 2 of the 6 straps are disposed on a forward edge of the outer frame. 2 of the 6 straps are disposed on an aft edge of the outer frame, and 2 of the 6 straps are disposed on each of a pair of side edges of the outer frame, each of the straps include an adjustment means to adjust an overall length of each of the straps and is adapted to allow for specific custom adjustment for a dog for a comfortable and secure fit and a quick release means. The harness having 6 openings that include 2 forward side openings adapted to accommodate two front legs of the dog, while 2 aft side openings are adapted to accommodate 2 rear legs of the dog. The straps are attached to the outer frame and form a stable base that reduces side-to-side movement.

The outer frame may be adapted to ride upon a water surface of a body of water while utilized by the dog. The outer frame may be made of rigid and self-floating material. The rigid and self-floating material may be selected from the group consisting of Styrofoam, plastic, or inflatable vinyl. The outer frame may be adapted to hold the dog that weighs 2-22 lbs. The outer frame may be 14" wide and 24" long. The outer frame may be adapted to hold the dog that weighs 23-57 lbs. The outer frame may be 18" wide and 30" long. The outer frame may be adapted to hold the dog that weighs 58-98 lbs. The outer frame may be 24" wide and 40" long. The outer frame may be adapted to hold the dog that weighs over 99 lbs. The outer frame may be 30" wide and 50" long. The adjustment means may be selected from the group consisting of a turnbuckle, a buckle, or a friction clamp. The quick release means may be a snap. The quick release means may be a clip. The legs of the dog may hang free for movement, but without supporting the dog as they are supported by the outer frame with the straps and the harness. The canine flotation device may further comprise a tow hook disposed on a forward edge of the outer frame for attachment of a rope or other pulling method. The canine flotation device may be a flotation aid for the dog undergoing water-based physical therapy rehabilitation. The canine flotation device may be a flotation aid for the dog performing one or more water-based activities. The canine flotation device may be waterproof and withstand continuous submersion in water without fading or failing.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
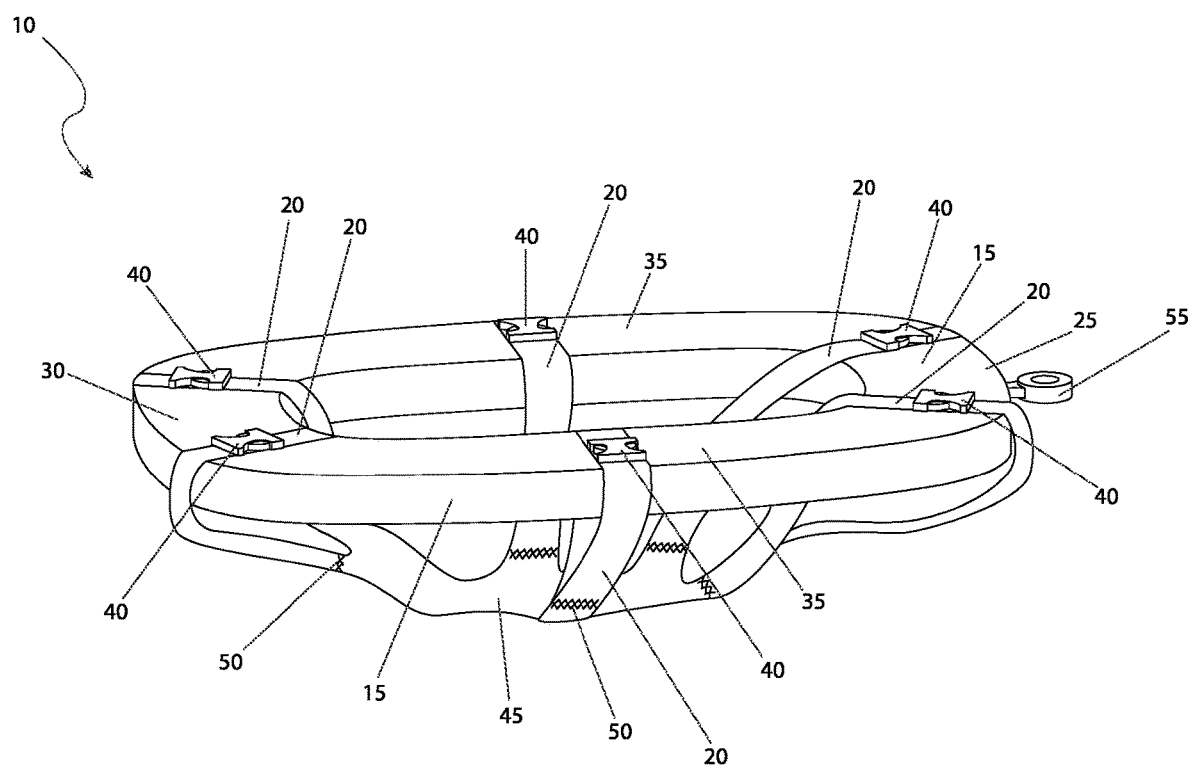
FIG. 1 is a perspective view of the canine flotation device, according to the preferred embodiment of the present invention.

DESCRIPTIVE KEY 10 canine flotation device
15 outer frame
20 strap
25 forward edge
30 aft edge
35 side edge
40 adjustment means
45 harness
50 stitching
55 tow hook
60 overall opening
65 forward opening
70 aft opening
75 forward side opening
80 aft side opening
85 hemispherical opening
90 side-to-side movement "s"
95 dog
100 water surface
105 body of water
110 leg

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one of the referenced items.

1. Detailed Description of the Figures

Referring now to FIG. 1, a perspective view of the canine flotation device 10, according to the preferred embodiment of the present invention is disclosed. The canine flotation device 10 (herein also described as the "device") 10, provides a flotation aid for dogs undergoing water-based physical therapy rehabilitation or other water-based activities. The device 10 is provided with an outer frame 15 which is envisioned to be rigid and self-floating. It may be made of rigid foam, such as Styrofoam®, plastic, inflatable vinyl, or the like such that it generally maintains its shape and will float. The exact material or method of construction used by the outer frame 15 is not intended to be a limiting factor of the present invention. The outer frame 15 would be made available in multiple sizes to fit all sizes of dogs. A small version that would hold dogs that weigh approximately two to twenty-two pounds (2-22 lbs.) would be approximately fourteen inches (14") wide and twenty-four inches (24") long. A medium version that would hold dogs that weigh between twenty-three and fifty-seven pounds (23-57 lbs.) would be approximately eighteen inches (18") wide and thirty inches (30") long. A large version that would hold dogs that weight between fifty-eight and nine-eight pounds (58-98 lbs.) would be approximately twenty-four inches (24") wide and forty inches (40") long. Finally, an extra-large version that would dogs over ninety-nine pounds (99 lbs.) would be approximately thirty inches (30") wide and fifty inches (50") long. The outer frame 15 is provided with six (6) straps 20. Two straps 20 would be located on the forward edge 25. Two (2) would be located on the aft edge 30, and one (1) each on each of the two (2) side edge 35. Each strap 20 is provided with an adjustment means 40 such as turnbuckle, buckle, friction clamp or the like to adjust the overall length of the straps 20. Said adjustment allows for specific custom adjustment for each dog for a comfortable and secure fit. The adjustment means 40 may be provided with a quick release means such as a snap, clip, or the like as well. The distal end of each strap 20 is secured to a harness 45 via stitching 50. Further detail on the harness 45 will be provided herein below. The overall construction of the device 10 including the straps 20 and the harness 45 is envisioned to be waterproof such that it withstands continuous submersion in water without fading or failing. It is designed to be rinsed off after use, allowed to dry in ambient air, and be re-used at any time. The overall color scheme of the device 10 may be bright or even self-luminescent so as to be visible in a water-based environment even in low light conditions. Finally, the forward edge 25 is provided with a tow hook 55 for attachment of a rope or other pulling method.

Figure 2:
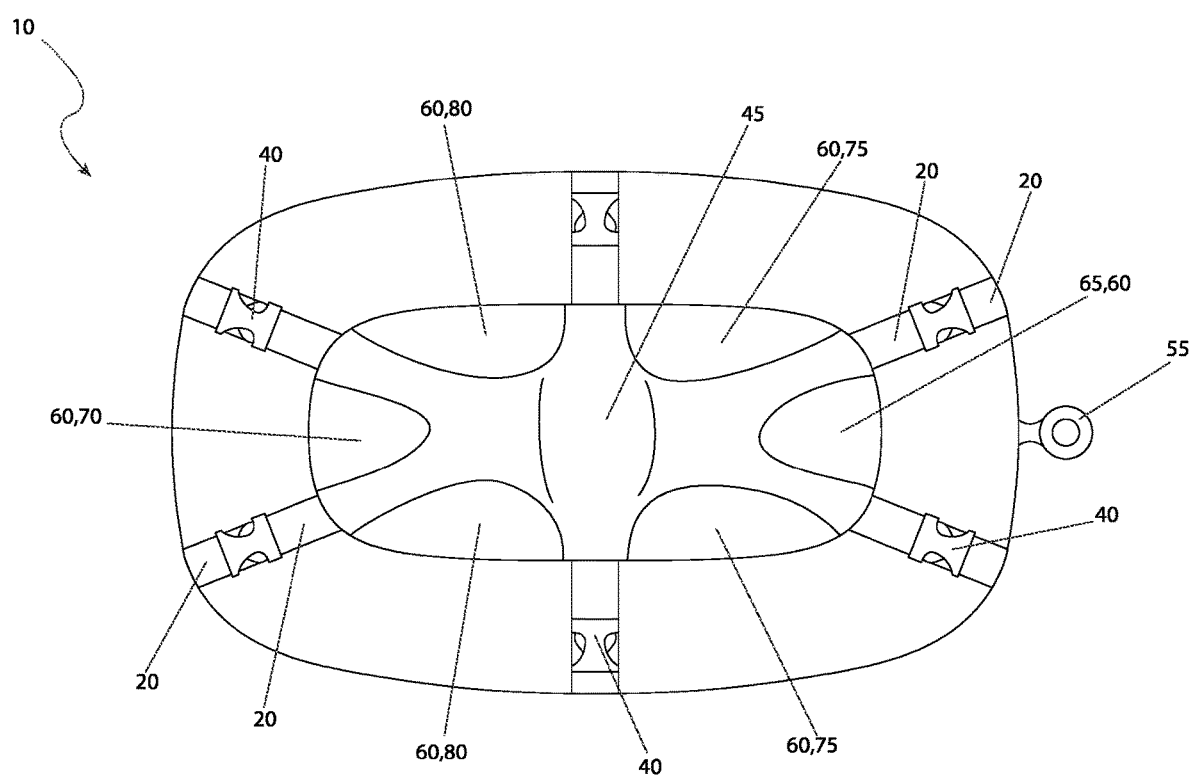
FIG. 2 is a top view of the canine flotation device, according to the preferred embodiment of the present invention.

Referring next to FIG. 2, a top view of the canine flotation device 10, according to the preferred embodiment of the present invention is depicted. Said view provides further clarification on the placement of the straps 20 upon the outer frame 15 as well as the easily accessible location of the adjustment means 40. The configuration of the harness 45 provides for six (6) overall openings 60. The forward opening 65 and the aft opening 70 provide for adjustment of the overall shape of the harness 45. The two (2) forward side openings 75 are provided for the two front legs of the dog, while the two (2) aft side openings 80 are provided for the two rear legs of the dog. Further detail on the usage of the forward side openings 75 and the aft side openings 80 will be provided herein below.

Figure 3:
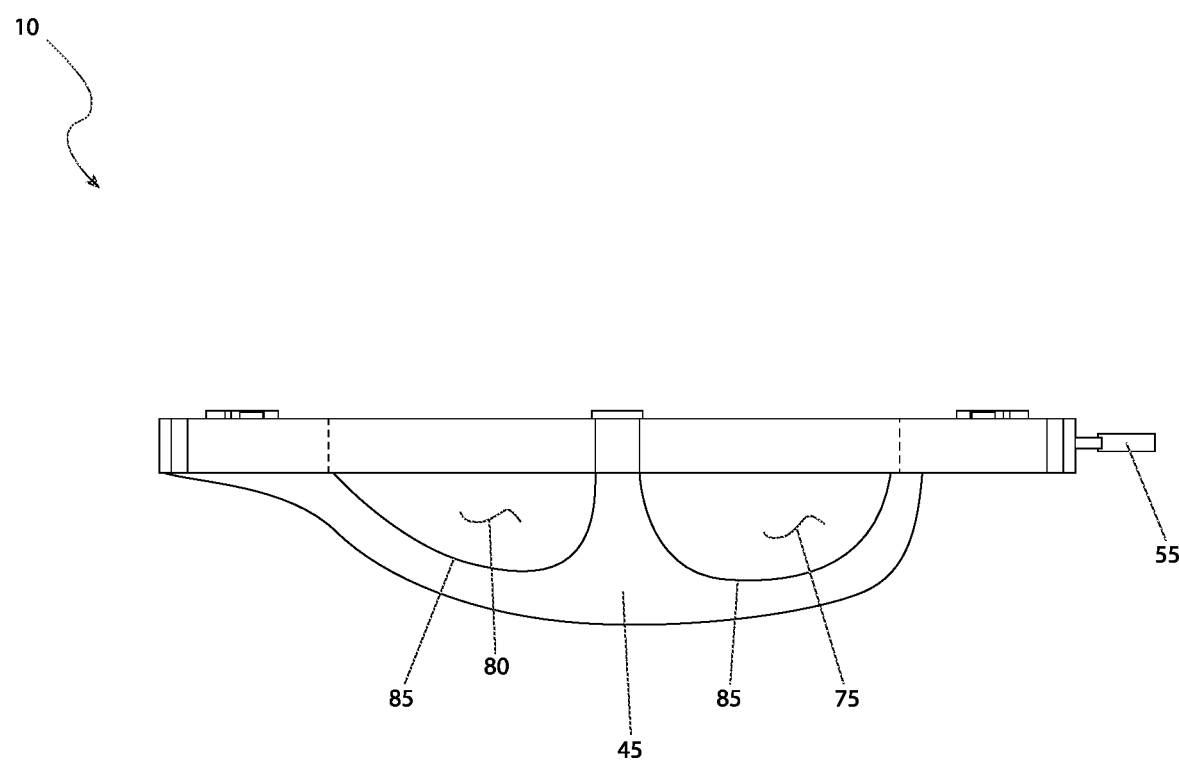
FIG. 3 is a side view of the canine flotation device, according to the preferred embodiment of the present invention.

Referring now to FIG. 3, a side view of the canine flotation device 10, according to the preferred embodiment of the present invention is shown. The side view provides clarification on the overall shape of the harness 45 such that it may provide support and security for a contained dog while not interfering with movement. The forward side openings 75 and the aft side openings 80 are provided with hemispherical opening(s) 85 that are positioned to support the body of the dog without impacting movement of the legs of the dog, as it moves in a swimming motion, such as the "dog paddle". The tow hook 55 provides for assistance in forward motion of the device 10.

Figure 4:
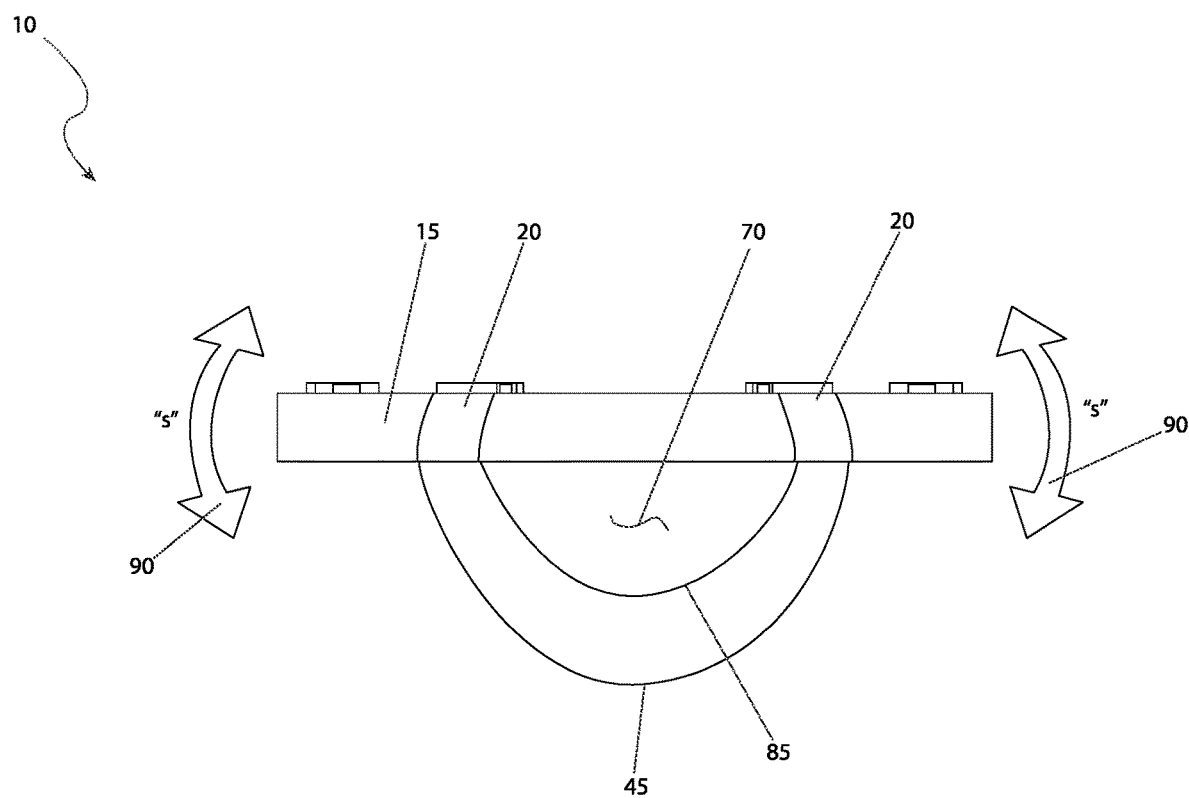
FIG. 4 is an end view of the canine flotation device, according to the preferred embodiment of the present invention.

Referring next to FIG. 4, an end view of the canine flotation device 10, according to the preferred embodiment of the present invention is disclosed. The aft opening 70, also equipped with a hemispherical opening(s) 85, is visible. The aft opening 70, as well as the forward opening 65 (as shown in FIG. 2) assists the harness 45 is obtaining a form fitting shape for various shapes and sizes of dogs. The straps 20 are attached to the outer frame 15 and form a stable base that reduces side-to-side movement "s" 90.

Figure 5:
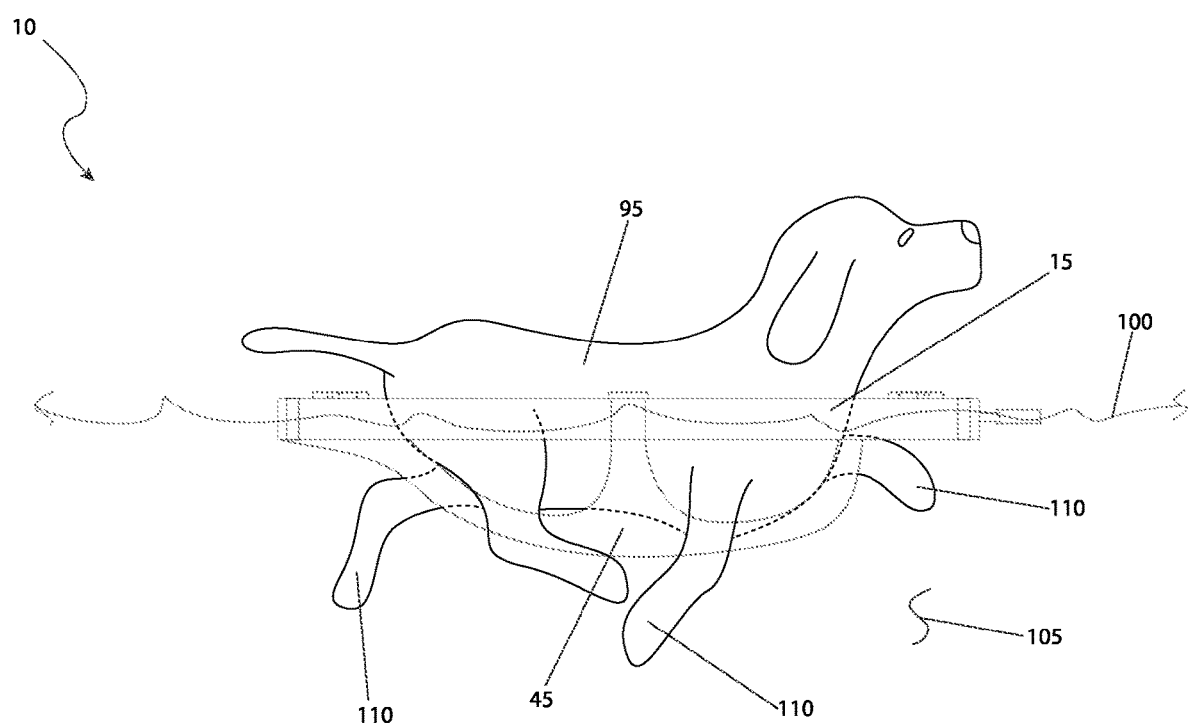
FIG. 5 is a pictorial view of the canine flotation device, shown in a utilized state, according to the preferred embodiment of the present invention.

Referring finally to FIG. 5, a pictorial view of the canine flotation device 10, shown in a utilized state, according to the preferred embodiment of the present invention is depicted. A dog 95 is positioned upon the harness 45 and inside of the outer frame 15 of the device 10. The outer frame 15 rides upon the water surface 100 of a body of water 105 such as a lake, pond, swimming pool, hot tub, or even a large bathtub. As such, the legs 110 of the dog 95 are able to hang free for movement, but without supporting the weight of the dog 95 as they are supported by the outer frame 15 via way of the straps 20 (as shown in FIGS. 1, 2 and 3) and the harness 45. These features are ideal for a dog 95 recovering from broken bones, surgery, or other illnesses or disability. The device 10 may also be used for healthy dogs to enjoy a water-based environment, perhaps with children or adults, for a longer period of time than would otherwise be possible without the device 10, while protecting the dog 95 from accidental drowning.

2. Operation of the Preferred Embodiment

One type of physical therapy commonly used is that of water-based or aqua-therapy. The water helps to support the patient and allows muscles to be used without having to bear the entire weight of the body. Such therapy is not only used on humans, but animals as well, such as horses and dogs. However, many dogs are afraid of the water and the action of placing them in the water will do more harm than good. Older dogs may quickly become stressed, whereupon their heart can become negatively impacted. Any attempt to support the dog will end up causing the assistant to become wet, scratched or otherwise harmed to the point that the therapy is given up on entirely to the detriment of the dog's overall health. Accordingly, there exists a need for a means by which a dog can be easily supported while taking part in water-based physical therapy in a manner which addresses the above concerns. The development of the canine flotation device 10 fulfills this need.

The preferred embodiment of the present invention can be utilized by the common user in a simple and effortless manner with little or no training. It is envisioned that the canine flotation device 10 would be constructed in general accordance with FIG. 1 through FIG. 5. The user would procure the canine flotation device 10 from conventional procurement channels such as pet stores, sporting goods stores, marine supply houses, mail order and internet supply houses and the like. Special attention would be paid to the size of the device 10 such that it can be used with the intended size of the dog 95.

After procurement and prior to utilization, the canine flotation device 10 would be prepared in the following manner: the straps 20 are custom adjusted for the specific dog 95 body shape using the adjustment means 40; the dog 95 is then positioned in the harness 45 such that legs 110 are in the two (2) forward side openings 75 and the two (2) aft side openings 80. At this point in time, the device 10 is ready for use.

During utilization of the canine flotation device 10, the following procedure would be initiated: the device 10, with the dog 95 inside, is placed in a body of water 105. The dog 95 can then participate in various movements and exercising routines in an effort to improve health. As aforementioned described, the device 10 can serve as a life vest style personal protective device (PPE).

After use of the canine flotation device 10, the dog 95 is removed and the device 10 is rinsed clean to allow for use in repeating and cyclical manner.

These features provide the following benefits: availability in tiny, small, medium, large, and extra-large sizes to fit all breeds of dogs; installs confidence in dogs that cannot swim; allows dogs to take part in water-based fun without worry of drowning; ideal for use with older dogs; and is easy to put on and take off.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims:

The invention claimed is:

1. A canine flotation device, consisting of:
   a planar outer frame having six straps, two of the six straps are disposed on a forward edge of the planar outer frame, two of the six straps are disposed on an aft edge of the planar outer frame, and two of the six straps are disposed on each of a pair of side edges of the planar outer frame, each of the straps include an adjustment means to adjust an overall length of each of the straps and is adapted to allow for specific custom adjustment for a dog for a comfortable and secure fit and a quick release means;
   a harness having a plurality of stitching securing an end of each of the straps to the harness, the harness having six openings that include two forward side openings adapted to accommodate two front legs of the dog, while two aft side openings are adapted to accommodate two rear legs of the dog, and two hemispherical openings are positioned to support a body of the dog without impacting movement of the dog, the straps are attached to the planar outer frame and form a stable base that reduces side-to-side movement; and,
   a tow hook disposed on a forward edge of the planar outer frame for attachment of a rope or other pulling method;
   wherein the planar outer frame is made of rigid and self-floating material;
   wherein the rigid and self-floating material is selected from the group consisting of closed-cell extruded polystyrene foam or inflatable vinyl; wherein the planar outer frame is adapted to ride upon a water surface of a body of water while utilized by the dog;
   wherein the adjustment means is selected from the group consisting of a turnbuckle, a buckle, or a friction clamp; and,
   wherein the legs of the dog hang free for movement without supporting a torso of the dog as the torso of the dog is supported by the planar outer frame with the straps and the harness.

\* \* \* \* \*